United States Patent
Selvidge et al.

(10) Patent No.: US 9,305,126 B2
(45) Date of Patent: Apr. 5, 2016

(54) SWITCHING ACTIVITY REDUCTION THROUGH RETIMING

(71) Applicant: Mentor Graphics Corporation, Wilsonville, OR (US)

(72) Inventors: Charles W. Selvidge, Wellesley, MA (US); Sanjay Gupta, Noida (IN); Praveen Shukla, Noida (IN); Saurabh Gupta, Ghaziabad (IN); Jeffrey Evans, Exeter (GB)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/222,404

(22) Filed: Mar. 21, 2014

(65) Prior Publication Data
US 2015/0269295 A1  Sep. 24, 2015

(51) Int. Cl.
*G06F 9/455* (2006.01)
*G06F 17/50* (2006.01)
*H03K 3/012* (2006.01)

(52) U.S. Cl.
CPC ............ *G06F 17/5031* (2013.01); *H03K 3/012* (2013.01)

(58) Field of Classification Search
CPC .................................................. G06F 17/5031
USPC ......................................................... 716/108
See application file for complete search history.

(56) References Cited

U.S. PATENT DOCUMENTS

| | | | |
|---|---|---|---|
| 8,255,847 B1* | 8/2012 | Brissenden et al. | 716/105 |
| 2010/0131912 A1* | 5/2010 | Ispir et al. | 716/9 |
| 2012/0054702 A1* | 3/2012 | Baumgartner et al. | 716/106 |
| 2014/0143744 A1* | 5/2014 | Dimond | 716/105 |

OTHER PUBLICATIONS

J. Monteriro et al., "Retiming Sequential Circuits for Low Power", in "Low Power VLSI Design and Technology" Ed. By G.K. Yeap and F.N. Najm, Selected Topics in Electronics and Systems—vol. 6, 1996 by World Scientific Publishing, pp. 101-118.
S. Simon et al., "Retiming of Latches for Power Reduction of DSP Designs", 1997 IEEE International Symposium on Circuits and Systems, Jun. 9-12, 1997, Hong Kong, pp. 2168-2170.
A. Ghosh et al., "Estimating of Average Switching Activity in Combinational and Sequential Circuits," 29th ACM/IEEE Design Automation Conference, 1992, paper 15.4.

* cited by examiner

*Primary Examiner* — Suresh Memula

(57) ABSTRACT

Aspects of the invention relate to techniques for using retiming to reduce circuit switching activity. Switching activity values at output ports of circuit elements of a circuit design are first computed based on switching activity values at input ports of the circuit elements and scaling factors associated with the circuit elements. Based on the switching activity values at the output ports of the circuit elements, one or more regions of the circuit design for retiming are identified. Retiming location information is then determined for the one or more regions. Finally, the identified one or more regions are then retimed to reduce switching activity based on the retiming location information.

23 Claims, 10 Drawing Sheets

Flow chart
500

Flow chart 500

SWITCHING ACTIVITY REDUCTION THROUGH RETIMING

FIELD OF THE INVENTION

The present invention relates to the field of circuit design technology. Various implementations of the invention may be particularly useful for reducing switching activity and thus power consumption of a circuit design.

BACKGROUND OF THE INVENTION

Low power consumption has become one of the most important features of current electronic systems. For popular consumer electronic applications such as mobile smart phones and tablets, low power consumption may be the tightest constraint in the design. Consequently, various techniques and tools that enable tight power consumption control during design have been developed. Many of these techniques and tools rely on changing the architecture or the technology of the circuit. But once these architectural or technological improvements have been made, it is the switching of the logic that will affect the power consumption.

One cause of the switching activity is signal propagation delays. FIG. 1 illustrates an example about how the switching activity can be caused by gate delays. The circuit 100 shown in the figure has a NOT gate 110 and an AND gate 120. The signal waveforms at nodes A, B and C are shown below. As can be seen from the waveforms, due to the delay of switching from high to low by the output of the NOT gate 110, the AND gate 120 outputs an unwanted pulse. In addition to the gate delay, wires can also cause a propagation delay. Wires have an approximate propagation delay of 1 ns for every 6 inches (15 cm) of length, while logic gates can have propagation delays ranging from more than 10 ns down to the picosecond range, depending on the technology being used.

The switching activity can be propagated and accumulated in a circuit, causing high cumulative switching activity in a portion of a circuit. Each node in the portion of the circuit has a switching activity value. The sum of the switching activity values for all of the nodes gives rise to a cumulative switching activity value, which can be extremely high. FIG. 2 illustrates an XOR tree commonly used in arithmetic operations such as addition and multiplication. The XOR tree 200 is formed by a plurality of three-input XOR gates. For a three-input XOR gate, the output is 0 if the initial state of the input signal is 101. On a given clock edge, the input signal changes to 010 and then the output of the XOR gate should switch to 1. Suppose, however, signals for the three input ports of the XOR gate arrive at different times under a sequence of "101-111-011-010". The output will go through a sequence of "0-1-0-1". Two unwanted transitions are thus caused by the delay. The unwanted transitions and propagation delays can cause more unwanted transitions at the output ports of the downstream XOR gates. The more stages of the XOR tree, the more unwanted transitions. Thus, a big and deep XOR tree can have a cumulative switching activity value close to a million.

Retiming has been proposed in some research papers as a technique to minimize the switching activity caused by the propagation delay. The technique is based on the observation that the output of a circuit state element such as a flip flop and a latch has fewer transitions than the input of the circuit state element. In particular, unwanted transitions can be blocked. To determine where to reposition circuit state elements, those research papers discuss employing some models to estimate average switching activity. While reasonably accurate, these models require significant computing resources and may not be feasible for applications to current large circuit designs. More efficient techniques are desirable.

BRIEF SUMMARY OF THE INVENTION

Aspects of the invention relate to techniques for using retiming to reduce circuit switching activity. With various embodiments of the invention, switching activity values at output ports of circuit elements of a circuit design are first computed based on switching activity values at input ports of the circuit elements and scaling factors associated with the circuit elements. The scaling factors represent effects of signal changes at the input ports on signal changes at the output ports. For circuit elements like logic gates, the scaling factor may be derived based on the logic gate types and the number of the input ports. The computation of switching activity values comprises calculating weighted sums of the switching activity values at the input ports of each of the circuit elements using the scaling factors as relative weights.

To account for a linearization effect, an upper threshold value derived based on signal propagation delay and slew rate may be assigned to the switching activity value at the output port of a circuit element if the weighted sum of the switching activity values at the input ports of the circuit element is greater than the upper threshold value.

To account for or model for potential worst case condition/ scenario, a switching activity value at one of the input ports of a circuit element may be assigned to the switching activity value at the output port of the circuit element if the weighted sum of the switching activity values at the input ports of the circuit element is less than the switching activity value at the one of the input ports.

Based on the switching activity values at the output ports of the circuit elements, one or more regions of the circuit design for retiming are identified. The identification processes may comprise deriving cumulative switching activity values for regions in the circuit design. The cumulative switching activity value of a region is the sum of all switching activity values in the region.

Next, retiming location information for the one or more regions is determined based on the switching activity values at the output ports of the circuit elements. The retiming location information comprises information of one or more circuit nodes for placing circuit state elements to reduce switching activity in each of the one or more regions. The retiming location information may comprise information of switching activity relaxing point nodes determined based on the cumulative switching activity values.

Finally, the identified one or more regions may be retimed based on the retiming location information. The operation of retiming comprises repositioning existing circuit state elements such as flip flops and latches. Additionally, the operation of retiming may comprise adding circuit state elements triggered at a clock edge inverse to that at which the existing circuit state elements are triggered (i.e., inverse-edge-triggered circuit state elements).

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

DETAILED DESCRIPTION OF THE INVENTION

General Considerations

Various aspects of the present invention relate to techniques for using retiming to reduce circuit switching activity. In the following description, numerous details are set forth for the purpose of explanation. However, one of ordinary skill in the art will realize that the invention may be practiced without the use of these specific details. In other instances, well-known features have not been described in details to avoid obscuring the present invention.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "compute" and "identify" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described.

Figure 1:
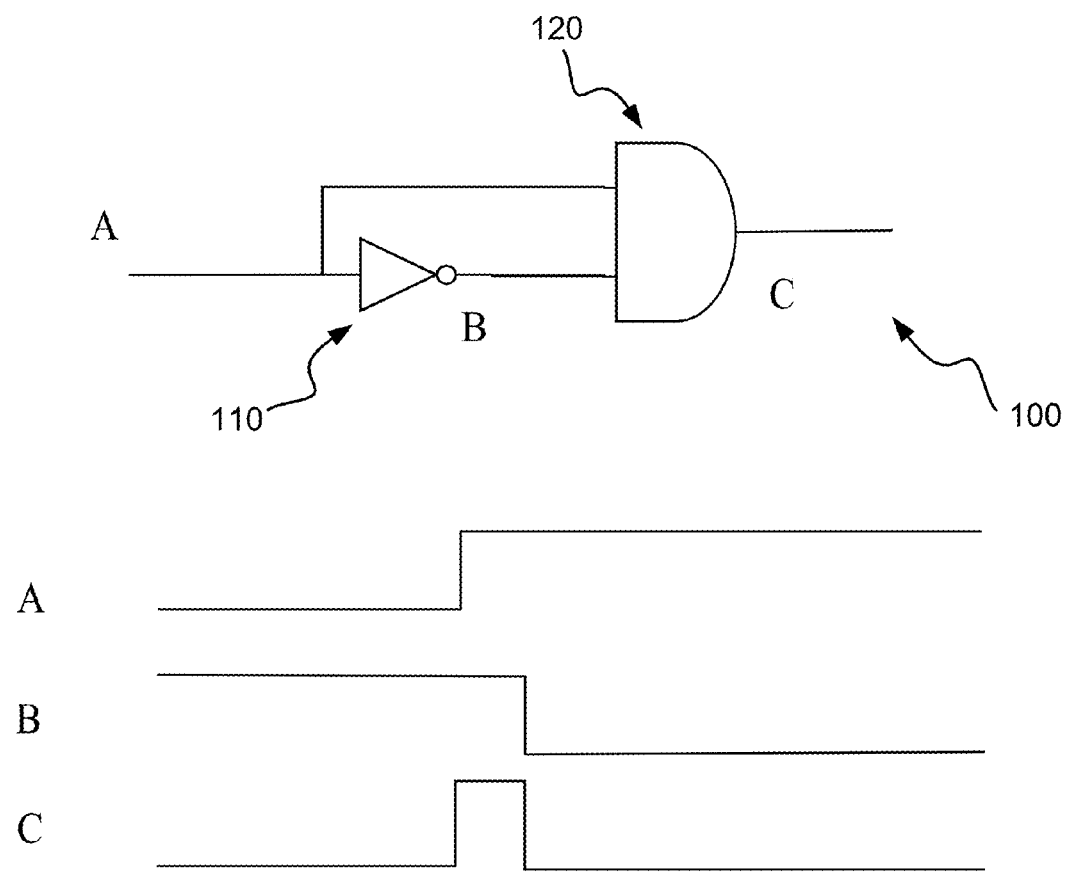
FIG. 1 illustrates an example about how gate delays can lead to switching activity.
Figure 2:
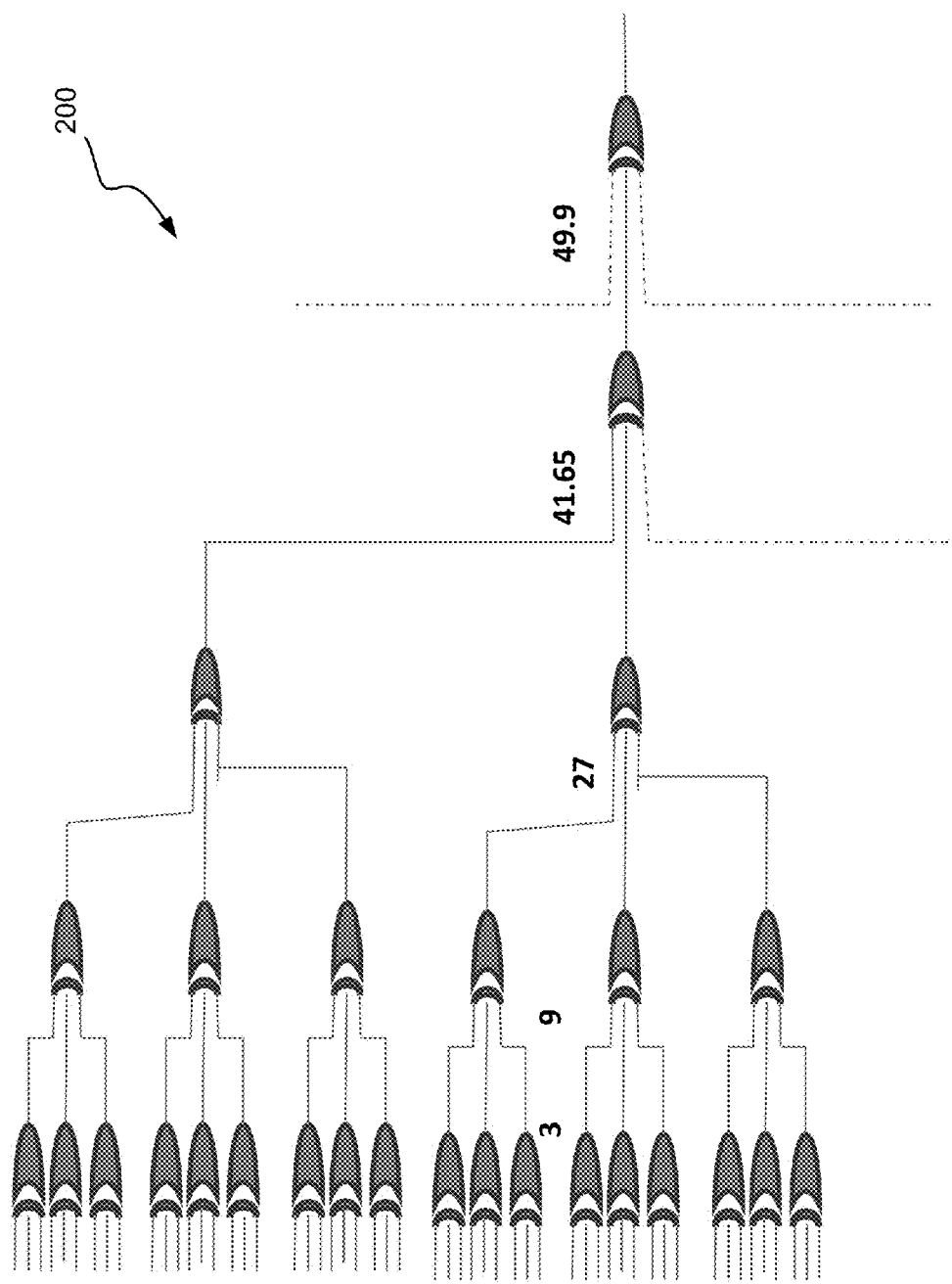
FIG. 2 illustrates an XOR tree commonly used in arithmetic operations such as addition and multiplication.
Figure 3:
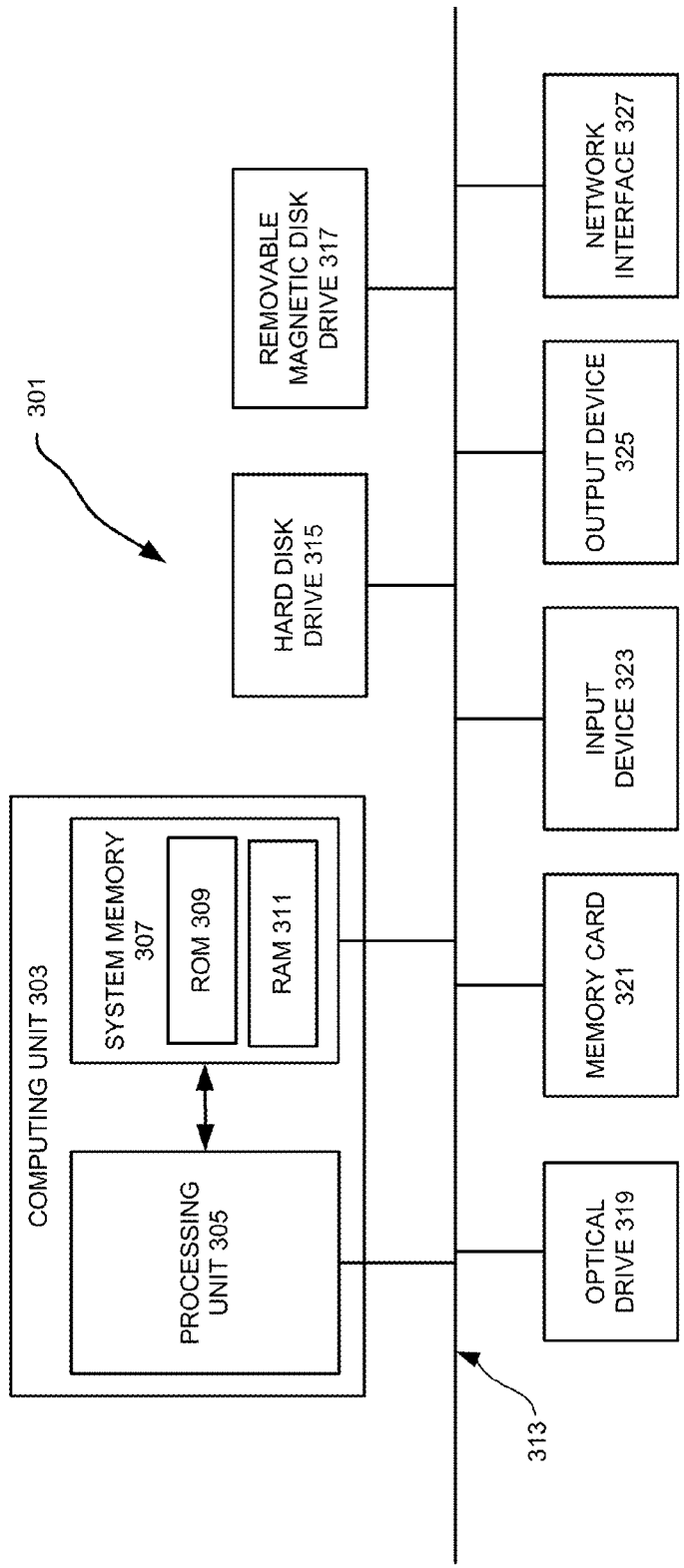
FIG. 3 shows an illustrative example of such a programmable computer system.

FIG. 3 shows an illustrative example of such a programmable computer system (a computing device 301). As seen in this figure, the computing device 301 includes a computing unit 303 with a processing unit 305 and a system memory 307. The processing unit 305 may be any type of programmable electronic device for executing software instructions, but will conventionally be a microprocessor. The system memory 307 may include both a read-only memory (ROM) 309 and a random access memory (RAM) 311. As will be appreciated by those of ordinary skill in the art, both the read-only memory (ROM) 309 and the random access memory (RAM) 311 may store software instructions for execution by the processing unit 305.

The processing unit 305 and the system memory 307 are connected, either directly or indirectly, through a bus 313 or alternate communication structure, to one or more peripheral devices. For example, the processing unit 305 or the system memory 307 may be directly or indirectly connected to one or more additional memory storage devices, such as a "hard" magnetic disk drive 315, a removable magnetic disk drive 317, an optical disk drive 319, or a flash memory card 321. The processing unit 305 and the system memory 307 also may be directly or indirectly connected to one or more input devices 323 and one or more output devices 325. The input devices 323 may include, for example, a keyboard, a pointing device (such as a mouse, touchpad, stylus, trackball, or joystick), a scanner, a camera, and a microphone. The output devices 325 may include, for example, a monitor display, a printer and speakers. With various examples of the computer 301, one or more of the peripheral devices 315-325 may be internally housed with the computing unit 303. Alternately, one or more of the peripheral devices 315-325 may be external to the housing for the computing unit 303 and connected to the bus 313 through, for example, a Universal Serial Bus (USB) connection.

With some implementations, the computing unit 303 may be directly or indirectly connected to one or more network interfaces 327 for communicating with other devices making up a network. The network interface 327 translates data and control signals from the computing unit 303 into network messages according to one or more communication protocols, such as the transmission control protocol (TCP) and the Internet protocol (IP). Also, the interface 327 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 301 is illustrated as an example only, and it is not intended to be limiting. Various embodiments of the invention may be implemented using one or more computing devices that include the components of the computer 301 illustrated in FIG. 3, which include only a subset of the components illustrated in FIG. 3, or which include an alternate combination of components, including components that are not shown in FIG. 3. For example, various embodiments of the invention may be implemented using a multi-processor computer, a plurality of single and/or multiprocessor computers arranged into a network, or some combination of both.

Retiming Tools and Methods

Figure 4:
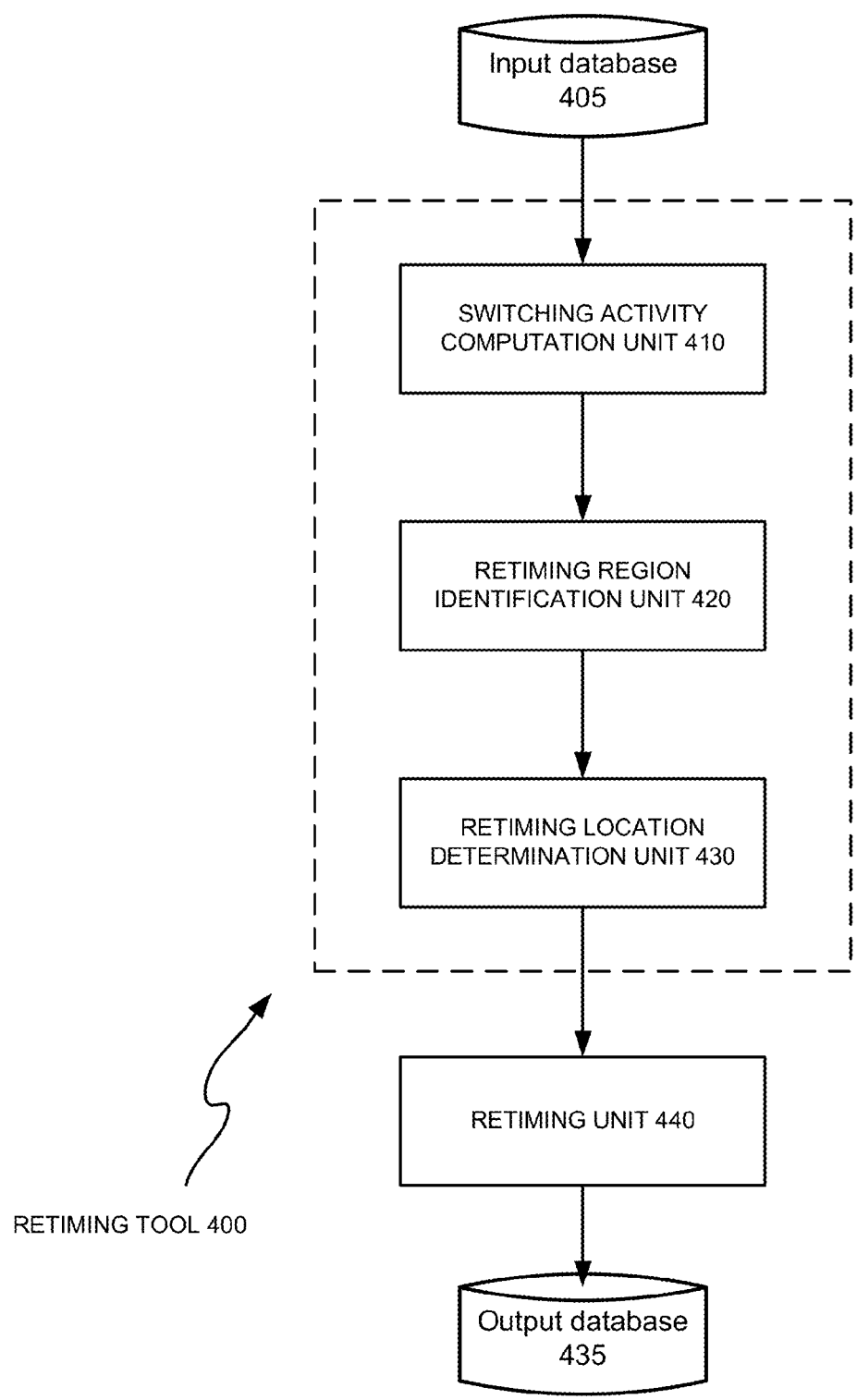
FIG. 4 illustrates an example of a retiming tool according to various embodiments of the invention.

FIG. 4 illustrates an example of a retiming tool according to various embodiments of the invention. As seen in the figure, the retiming tool 400 includes three units: a switching activity computation unit 410, a retiming region identification unit 420 and a retiming location determination unit 430. Some implementations of the retiming tool 400 may cooperate with (or incorporate) one or more of, a retiming unit 440, an input database 405 and an output database 435.

As will be discussed in more detail below, the switching activity computation unit 410 computes switching activity values. Based on the switching activity values, the retiming region identification unit 420 identifies one or more regions of the circuit design that have high switching activity. The retiming location determination unit 430 then determines retiming location information for the one or more regions based on the switching activity values. Finally, the retiming unit 440 retimes the one or more identified regions based on the retiming location information.

As previously noted, various examples of the invention may be implemented by a computing system, such as the computing system illustrated in FIG. 3. Accordingly, one or more of the switching activity computation unit 410, the retiming region identification unit 420, the retiming location determination unit 430 and the retiming unit 440 may be implemented by executing programming instructions on one or more processors in a computing system such as the computing system illustrated in FIG. 3. Correspondingly, some other embodiments of the invention may be implemented by software instructions, stored on a non-transitory computer-readable medium, for instructing one or more programmable computers/computer systems to perform the functions of one or more of the switching activity computation unit 410, the retiming region identification unit 420, the retiming location determination unit 430 and the retiming unit 440. As used herein, the term "non-transitory computer-readable medium" refers to computer-readable medium that are capable of storing data for future retrieval, and not propagating electromagnetic waves. The non-transitory computer-readable medium may be, for example, a magnetic storage device, an optical storage device, a "punched" surface type device, or a solid state storage device.

It also should be appreciated that, while the switching activity computation unit 410, the retiming region identification unit 420, the retiming location determination unit 430 and the retiming unit 440 are shown as separate units in FIG. 4, a single servant computer (or a single processor within a master computer) may be used to implement two or more of these units at different times, or components of two or more of these units at different times.

With various examples of the invention, the input database 405 and the output database 435 may be implemented using any suitable computer readable storage device. That is, either of the input database 405 and the output database 435 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, punched media, holographic storage devices, or any other non-transitory storage medium that can be used to store desired information. While the input database 405 and the output database 435 are shown as separate units in FIG. 4, a single data storage medium may be used to implement some or all of these databases.

Figure 5:
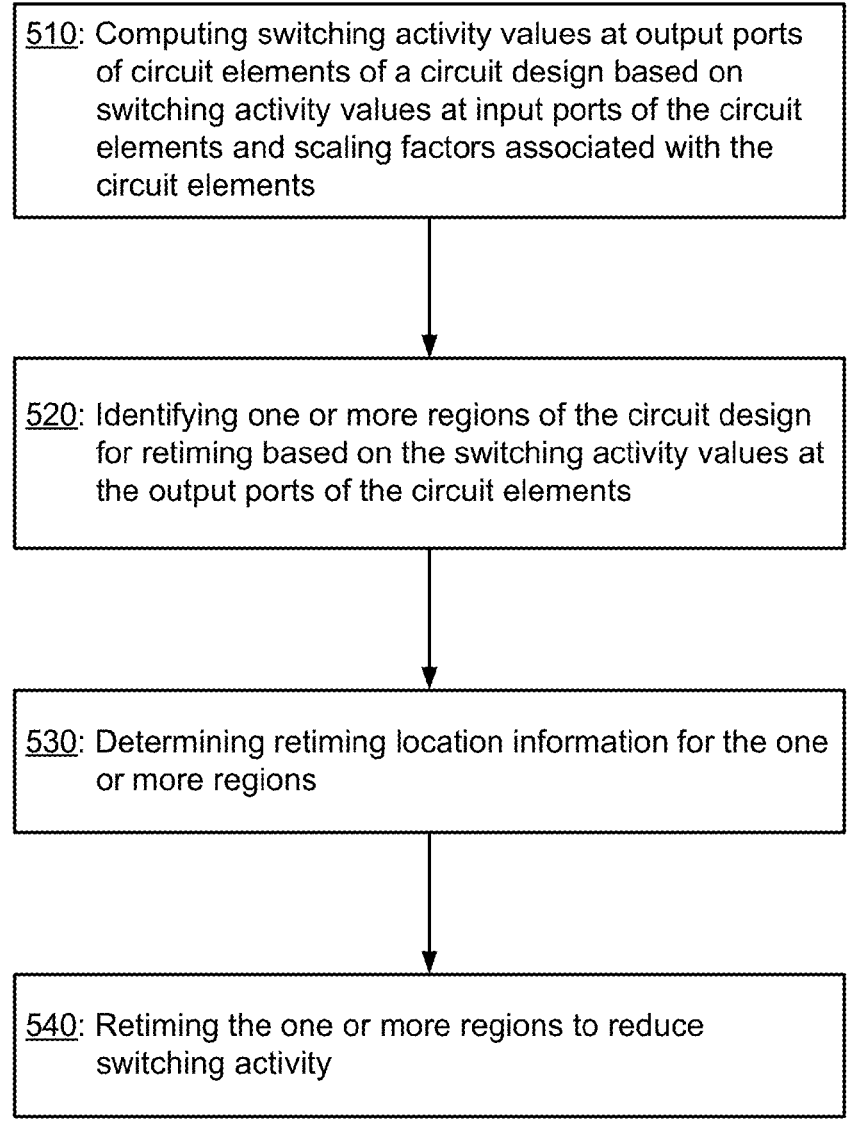
FIG. 5 illustrates a flowchart showing a process of retiming to reduce switching activity that may be implemented according to various examples of the invention.
Figure 5:

FIG. 5 illustrates a flowchart showing a process of retiming to reduce switching activity that may be implemented according to various examples of the invention. For ease of understanding, methods of retiming to reduce switching activity that may be employed according to various embodiments of the invention will be described with reference to the retiming tool 400 illustrated in FIG. 4 and the flow chart 500 in FIG. 5. It should be appreciated, however, that alternate implementations of a retiming tool may be used to perform the method of retiming to reduce switching activity shown in the flow chart 500 according to various embodiments of the invention. In addition, it should be appreciated that implementations of the retiming tool 400 may be employed to implement methods of retiming to reduce switching activity according to different embodiments of the invention other than the one illustrated by the flow chart 50 in FIG. 5.

Initially, in operation 510, the switching activity computation unit 410 computes switching activity values at output ports of circuit elements of a circuit design based on switching activity values at input ports of the circuit elements and scaling factors associated with the circuit elements. As a starting point, the switching activity values at primary input ports may be set as 1. The switching activity value at the output of a flip flop may also be set as 1 because the output changes only with respect to the clock.

Each circuit element is assigned one or more scaling factors representing the effect of signal changes at the input ports on signal changes at the output ports. The scaling factor may be derived based on the type of the circuit element and the number of the input ports. For a two-input XOR gate, for example, a value change (switching activity) at one input port will lead to a value change (switching activity) at the output port no matter whether the signal at the other input port is a logic 1 or 0. The scaling factor of the two-input XOR gate may thus be set as 1. On the other hand, a value change at one input port of a four-input AND gate will result in a value change at the output port of the AND gate only when all three other input ports are held to a logic value of 1. This represents one out of eight possible input value combinations. Accordingly, the scaling factor of the four-input AND gate may be set as ⅛.

The switching activity value at the output port of a circuit element such as a logic gate may then be calculated by obtaining a weighted sum of the switching activity values at the input ports using the scaling factor as relative weight. Accordingly, the two-input XOR gate has a switching activity value at its output port of (X+Y), while the four-input AND gate has a switching activity value of (⅛*W+⅛*X+⅛*Y+⅛*Z) at its output port. Here, W, X, Y and Z represent the input activity values.

With various implementations of the invention, an upper threshold value may be set for the switching activity value at the output of a circuit element. The upper threshold value is used to account for a linearization effect—the switching activity also depends on the wire length and slew rate for 0-1 and 1-0 transitions. This value can't be computed precisely but can be approximated as some linear function of the maximum depth path to reach the signal starting at state elements or inputs. Given a bounded slew rate, there is a finite minimum time for the signal to go up and then down. The switching activity value may be bounded by the time for the signal to reach a stable value divided by the average of rise and fall time. If a minimum delay is known for the fastest path to reach the signal from an input or state element then the bound may be further improved to be (max delay–min delay)/Average up/down time OR (max delay–min delay)*2/(up time+down time).

To account or model for potential worst case condition/scenario, some embodiments of the invention may assign the switching activity value of an input port of a circuit element to the switching activity value of an output port of the circuit element if the input port activity value exceeds the value which would be computed for the output port using other means. For example, with low scaling factors, the weighted sum may be smaller than the switching activity values at one or more input ports of a circuit element. The circuit element may serve as a buffer for the input with the maximum switching activity value. Accordingly, the maximum switching activity value of any input, rather than the weighted sum, may be used as the switching activity value at the output port.

The following is an example of a pseudo code for computing switching activity values:

```
// SA(u): denotes the Score Activity of a node 'u'.
// MaxDepth(u): Max Depth of the node 'u' in the design from the primary input/state
element.
// MinDepth(u): Min Depth of the node 'u' in the design from the primary input/state
element.
    const cTransitionsPerMFCDelay = 25;
    computeScoreActivityForANode (v)
{
    outScore = 0;
    maxInScore = 0;
    maxDepth = –1;
    minDepth= 1000000;
    // Compute the activity by traversing all its fan-ins..
    for each node 'u' such that there is any edge from u to v
    {
        inScore = SA(u);
        // inScaleFactor is the scaling factor of input node 'u'
        // for the corresponding node 'v'.
        outScore += inScore * inScaleFactor;
        if (inScore > maxInScore)
        {
```

-continued

```
            maxInScore = inScore;
    }
    depth = MaxDepth(u);
    if (depth > maxDepth)
    {
        maxDepth = depth;
    }
    mdepth = MinDepth(u);
    if (mdepth < minDepth)
    {
        minDepth = mdepth;
```

-continued

```
    }
}
/** To Handle the non-linearity in the algorithm **/
// maxInScore models the fact that in the worse case even a LUT with
// a low activity equation may be in a state that treats an input as
// a buffer as long as this is true for some state of the other
// inputs. So if the weighted sum of input scores is less than the
// maximum score on some input, model as if the LUT is in a state
// that transmits all changes on this input. However, add a small
// decay term so that in a chain of low activity LUTs there is a
// decrease in score.
    maxInScore = maxInScore * 0.95;
    Float64 depth_limit =
        cTransitionsPerMFCDelay * (maxDepth + 1.0 –
        (2.0*(minDepth+1.0)/3.0));
/** For the Linearization effect **/
    if (outScore > depth_limit)
    {
        outScore = depth_limit;
    }
    if (outScore > maxInScore)
    {
        maxInScore = outScore;
    }
    SA(v) = maxInScore;
    MaxDepth(v) = maxDepth+1;
    MinDepth(v) = minDepth+1;
}
```

Figure 6:
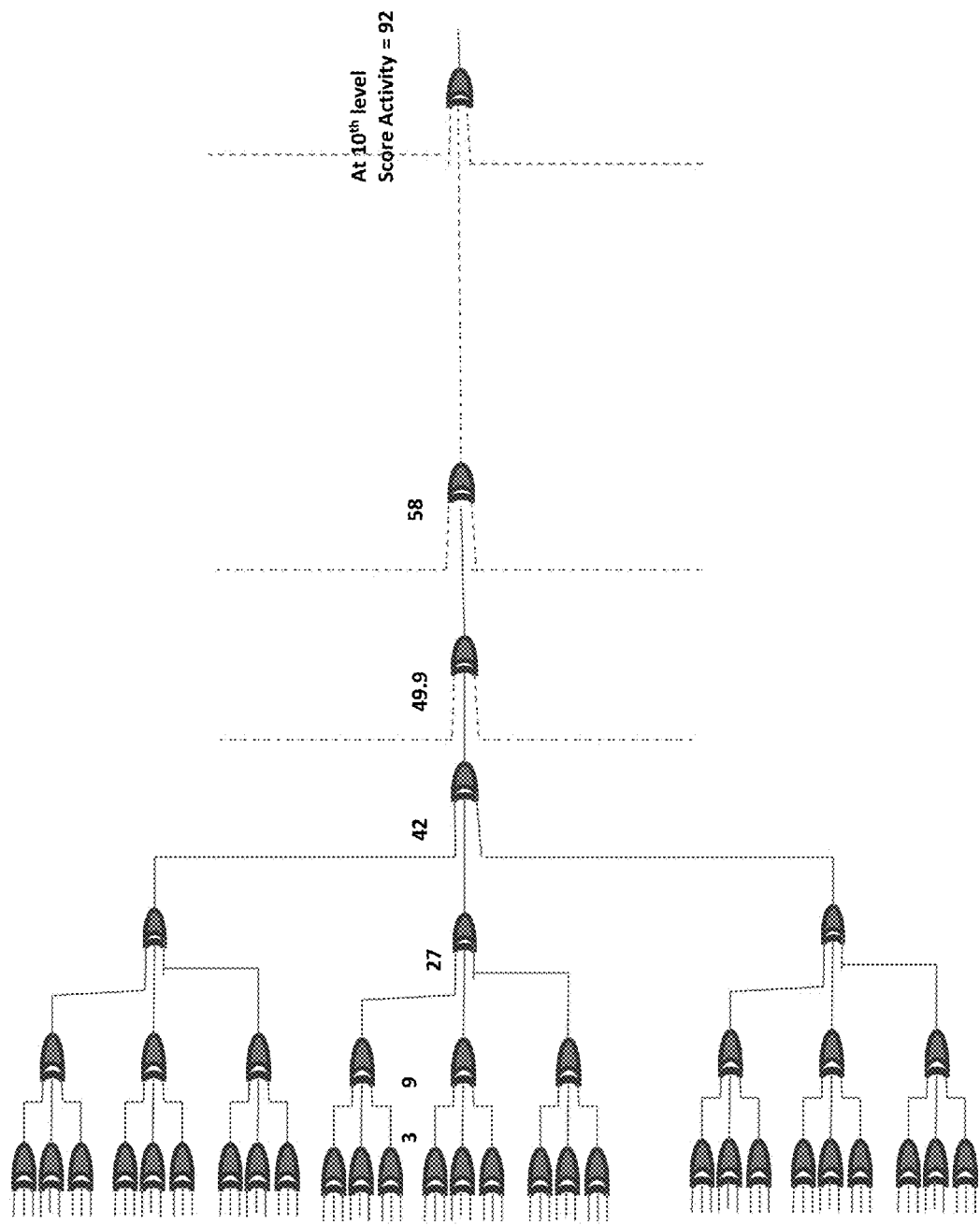
FIG. 6 illustrates an example of a ten-level XOR tree.

Based on the computed switching activity values, in operation 520, the retiming region identification unit 420 identifies one or more regions of the circuit design that have high switching activity. The identification processes may comprise deriving cumulative switching activity values for regions in the circuit design. The cumulative switching activity value of a region is the sum of all switching activity values in the region. FIG. 6 illustrates an example of a ten-level XOR tree. Table 1 lists the switching activity value for each XOR gate at each level and the number of nodes at each level that may be derived by an algorithm similar to the pseudo code shown in operation 510. Using the data in Table 1, the cumulative switching activity value for the XOR tree is calculated to be $2.86 \times 10^5$. While this number may reflect the worst case scenario, it indicates that the switching activity for this region is too high and that a significant amount of power may be consumed by the switching activity.

TABLE 1

| Level | 0 | 1 | 2 | 3 | 4 | 5 | 6 | 7 | 8 | 9 | 10 |
|---|---|---|---|---|---|---|---|---|---|---|---|
| Activity Values | 1 | 3 | 9 | 27 | 41.6 | 50 | 58.3 | 66.6 | 75 | 83.3 | 91.7 |
| Num. Nodes | $3^{10}$ | $3^9$ | $3^8$ | $3^7$ | $3^6$ | $3^5$ | $3^4$ | $3^3$ | $3^2$ | $3^1$ | $3^0$ |

Using the cumulative switching activity values, the retiming region identification unit 420 then identifies one or more regions of the circuit design for retiming. For example, the retiming region identification unit 420 may select a cumulative switching activity threshold to identify regions for retiming. Any regions in the circuit with cumulative switching activity values above the threshold will be selected to be processed by the following retiming operation. The threshold may be determined by heuristics.

Next, in operation 530, the retiming location determination unit 430 determines retiming location information for the one or more regions based on the switching activity values at the output ports of the circuit elements. The retiming location information comprises information of one or more circuit nodes for placing circuit state elements to reduce switching activity in each of the one or more regions.

A conventional operation of retiming comprises repositioning the circuit state elements such as flip flops and latches in a sequential circuit while maintaining its external functional behavior. Retiming has been widely used to minimize the delay of the longest path, thus allowing the circuit to operate at higher clock speeds. This retiming application relies on the fact that delay varies linearly under retiming. Unfortunately, it is not so with switching activity.

To reduce switching activity, circuit nodes for placing circuit state elements are determined differently by the retiming location determination unit 430. With some implementation of the invention, these circuit nodes are referred to as switching activity relaxing point nodes. The switching activity relaxing point nodes are determined based on the cumulative switching activity values derived in the operation 520. The following is an example of a pseudo code for determining switching activity relaxing point nodes:

```
ARCheck(G, TCA)
For each node v
{
    If (v is a PI)
        s(v) = 0;
    Else
        s(v) = -infinity;
    isActivityRelaxPoint(v) = FALSE;
    ComputeRF(v, TCA);
}
For I = 1 to n // n is the number of nodes.
{
Done = TRUE;
    For each node 'v'
    {
        // calculate the maximum Required Flop values from all its
        fan-in
maxRF = max (RF(u)) from all u's such that there is an edge from u to v.
        For each node 'u' such that there is any edge from u to v
        {
            tmp = max (s(u)- w(e));
            if (RF(v) > maxRF)
            {
                // We need to pull one flop
                tmp++;
            }
    }
If (tmp > 1.0 && v is a PO)
    return failure; // TCA cann't be achieved as sufficient flops are not
    present.
If (tmp > s(v))
{
    s(v) = tmp;
    done = FALSE;
}
}
}
    If (done == TRUE) return success
}
}
        If (done == TRUE)
        {
/** Activity Relax Points are identified where flop needs to be inserted so
as to
achieve the target cumulative activity of the design**/
For each node 'v' in the circuit
{
    isValuePropagated = FALSE;
    For each node 'u' such there is an edge from u to v
    {
        If ((s(u) - w(e)) == s(v))
        {
            isValuePropagated = TRUE;
            break;
```

```
        }
    }
If (isValuePropagated == FALSE)
{
            isActivityRelaxPoint(v) = TRUE;
}
}
        }
    ComputeRF(v, TCA)
    {
            Activity = FCA(v);
NumFFReqd = 0;
While (Activity >= TCA)
{
    Activity = Activity/TCA;
    NumFFReqd++;
}
return NumFFReqd;
        }
```

It should be noted that the algorithm shown above for determining switching activity relaxing point nodes is only one example. It is not intended to be limiting. Other methods for determining circuit nodes for placing circuit state elements may be implemented. For example, after determining the first switching activity relaxing point node, the switching activity values may be re-calculated by setting switching activity values at the output ports of the flip flops for the first switching activity relaxing point node as 1.

After the circuit nodes for placing circuit state elements are determined, the retiming unit 440 may, in operation 540, reposition the circuit state elements to or near these nodes.

Figure 7:
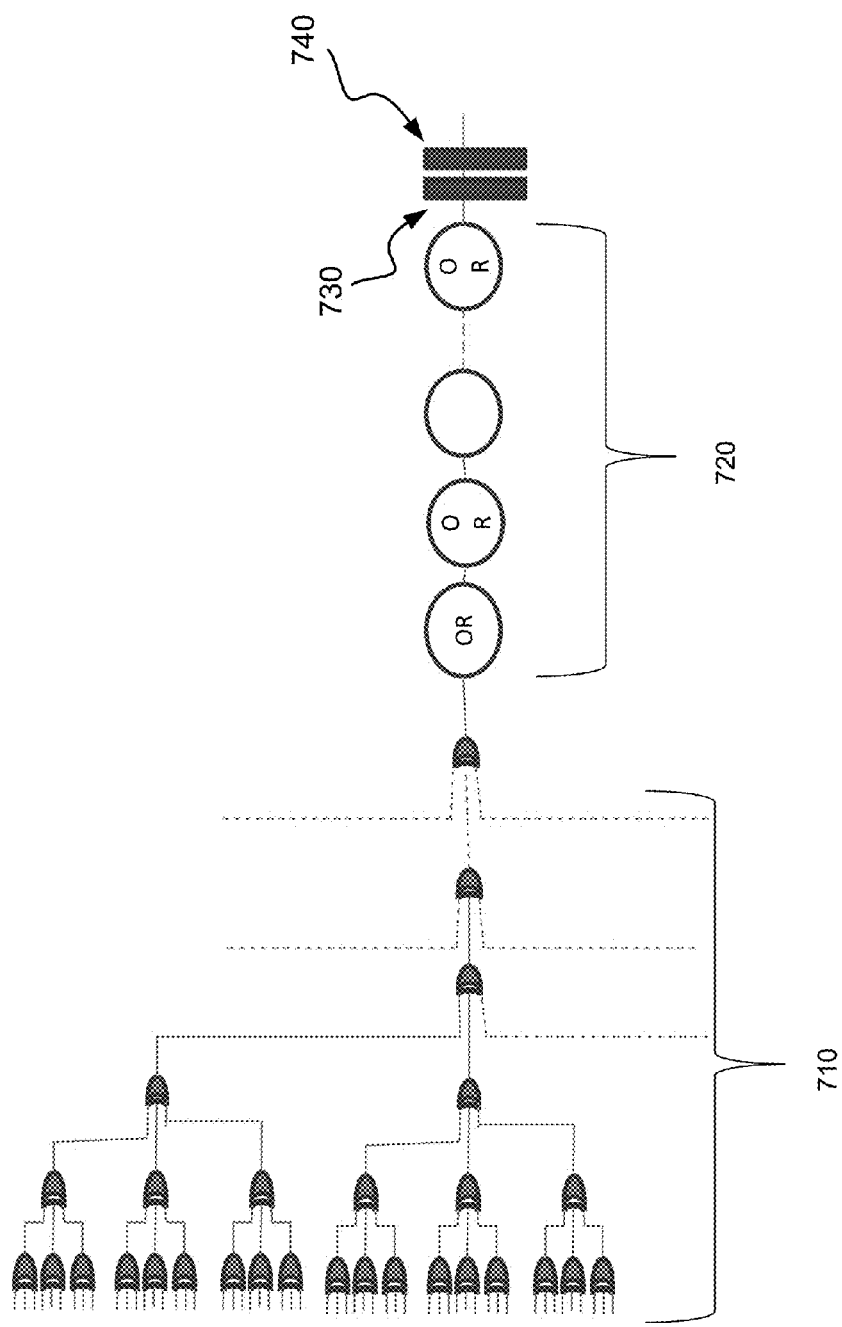
FIG. 7 illustrates a region with high switching activity in a circuit design.
Figure 8:
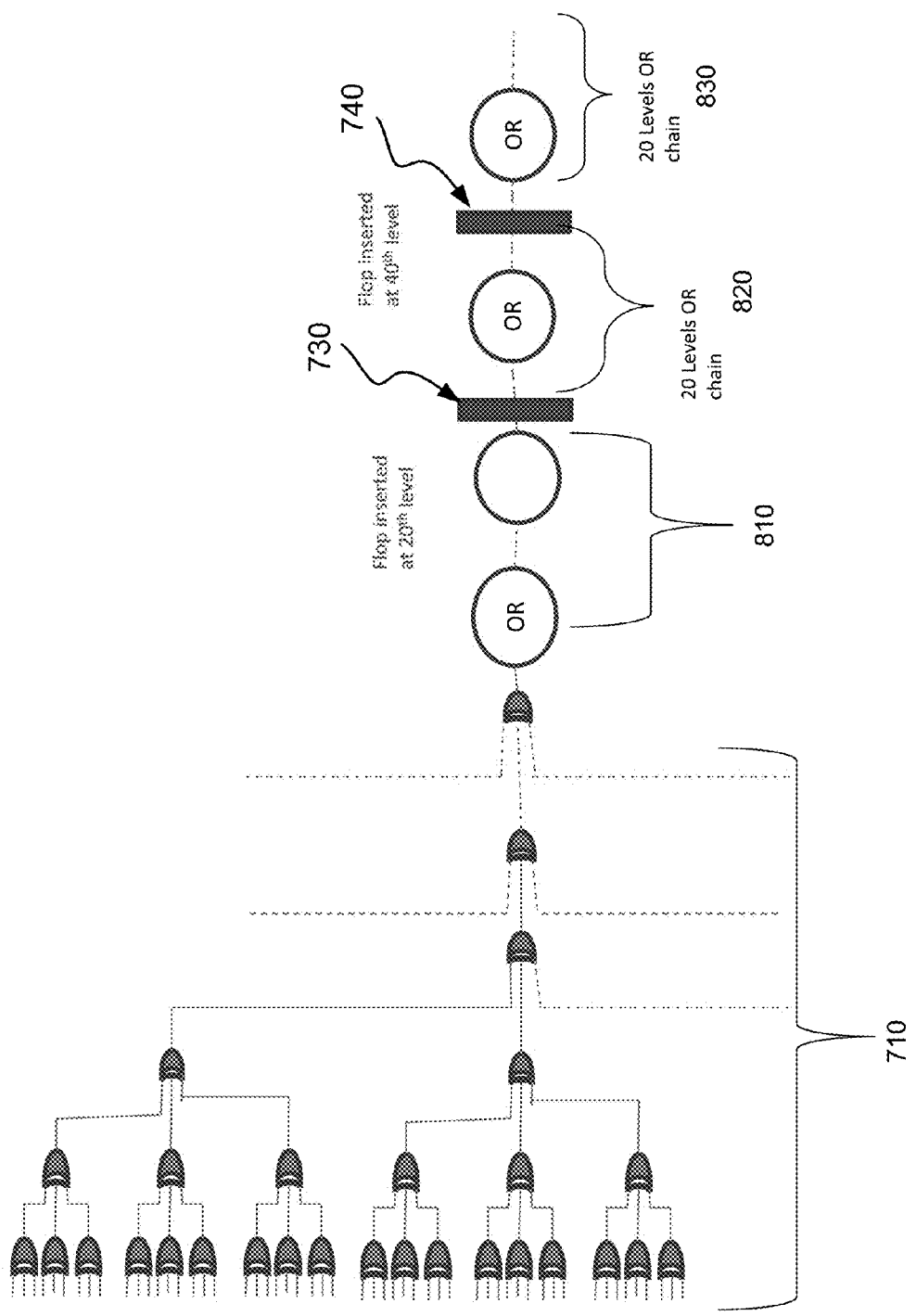
FIG. 8 illustrates an example of retiming the region 700 to improve circuit speed (prior art).
Figure 9:
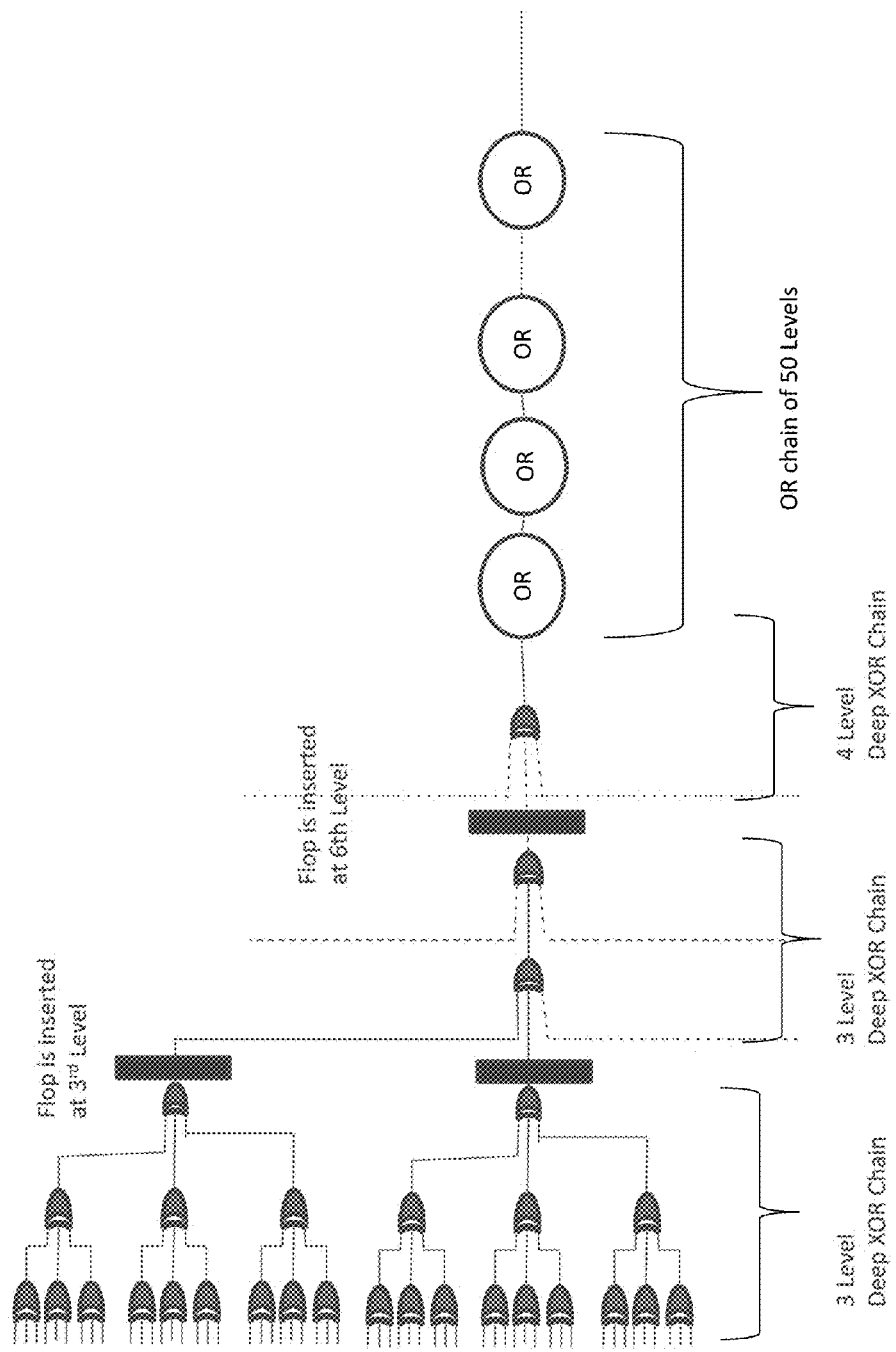
FIG. 9 illustrates an example of retiming the region 700 to reduce switching activity according to various embodiments of the invention.

FIGS. 7-9 uses an example to illustrate and compare the retiming for improving circuit speed and the retiming for reducing switching activity. In FIG. 7, a region of a circuit design with high switching activity (a region 700) is illustrated. The region 700 comprises a 10-level XOR tree 710 similar to the one shown in FIG. 6. As discussed previously, the cumulative switching activity value of the 10-level XOR tree alone may reach $2.86 \times 10^5$. Also included in the region 700 is an OR chain 720 and two flip flops 730 and 740.

FIG. 8 illustrates an example of retiming the region 700 to improve circuit speed. To reduce the path delay, the flip flops 730 and 740 are repositioned at the $20^{th}$ level (10 levels of XOR gates+10 levels of OR gates) and the $40^{th}$ level (20 levels of OR gates), respectively. In effect, the region is divided into three portions ((710+810), 820, and 830) with equal delay paths by the flip flops. This is because, as noted previously, delay varies linearly under retiming.

FIG. 9 illustrates an example of retiming the region 700 to reduce switching activity according to various embodiments of the invention. The cumulative switching activity values (FCA) and the switching activity relaxing point nodes indicated by RF are listed in Table 2:

TABLE 2

| Level | 0 | 1 | 2 | 3 | 4 | 5 | 6 | 7 | 8 | 9 | 10 |
|---|---|---|---|---|---|---|---|---|---|---|---|
| FCA | 1 | 6 | 27 | 108 | 365 | 1146 | 3499 | 10563 | 31763 | 95372 | $2.86 \times 10^5$ |
| RF | 0 | 0 | 0 | 1 | 1 | 1 | 1 | 2 | 2 | 2 | 2 |

The FCA value is obtained by using the equation: FCA(v)=switching activity value at v+3*FCA(v−1). The RF(v) is obtained by using the algorithm shown above (the subroutine ComputeRF(v, TCA)), assuming the target cumulative switching activity value between neighboring flip flops (TCA) is 102. As Table 2 shows, the RF(v) changes values at the $3^{rd}$ level and the $7^{th}$ level. The switching activity relaxing point nodes may be set at these nodes. To make it symmetric, the flip flops are repositions at the $3^{rd}$ and $6^{th}$ levels, as illustrated in FIG. 9. After the retiming, the accumulative switching activity value for the whole region is 284, significantly smaller than $2.86 \times 10^5$.

Figure 10:
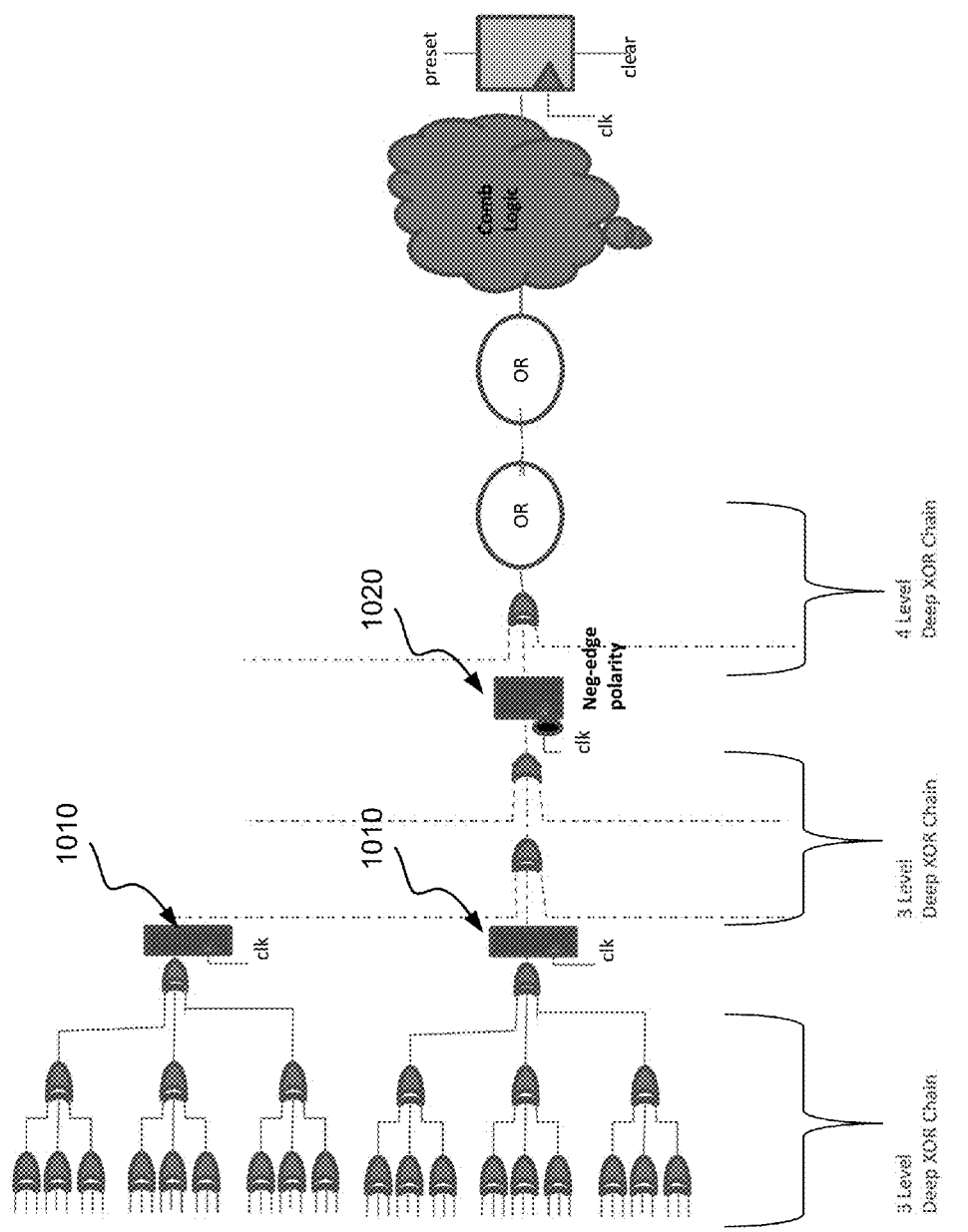
FIG. 10 illustrates an example of repositioning and adding circuit state elements according to various embodiments of the invention.

In addition to repositioning circuit state elements, the retiming unit 440 may also add inverse-edge-triggered circuit state elements if repositioning existing state elements is not sufficient to meet the target cumulative switching activity value. FIG. 10 illustrates an example of repositioning and adding circuit state elements according to various embodiments of the invention. The circuit in FIG. 10 is the same as the circuit in FIG. 9 except there is only one existing pipe-line flip flop 1010 for retiming. It is obvious from Table 2 that repositioning the existing flip flop 1010 cannot meet the target cumulative switching activity value of 102. If devices in the fan-out cone of this original flip flop are all triggered on the same clock edge as this pipe-line one, negative-edge-triggered flip flops may be added after the repositioned flip flops. This addition will not change the functionality of the circuit design. In FIG. 10, the existing flip flop 1010 is repositioned at the $3^{rd}$ level of the XOR tree and the negative-edge-triggered flip flop 1020 is added at the $6^{th}$ level of the XOR tree.

If devices in the fan-in cone of the pipe-line flip flop are triggered on the same clock edge as the pipe-line flip flop, the negative-edge-triggered flip flops may be added before the pipe-line flip flop. This addition will also not change the functionality of the circuit design.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

What is claimed is:

1. A method, executed by at least one processor of a computer, comprising:
    computing switching activity values at output ports of circuit elements of a circuit design based on switching activity values at input ports of the circuit elements and scaling factors associated with the circuit elements, the scaling factors representing effects of signal changes at the input ports on signal changes at the output ports, the computing comprising calculating weighted sums of the switching activity values at the input ports of each of the circuit elements using the scaling factors as relative weights;
    identifying one or more regions of the circuit design for retiming based on the switching activity values at the output ports of the circuit elements; and
    determining retiming location information for the one or more regions based on the switching activity values at the output ports of the circuit elements, the retiming location information comprising information of one or more circuit nodes for placing circuit state elements to reduce switching activity in each of the one or more regions.

2. The method recited in claim 1, further comprising:
    retiming the one or more regions based on the retiming location information.

3. The method recited in claim 2, wherein the retiming comprises:
    repositioning circuit state elements in the one or more regions.

4. The method recited in claim 3, wherein the retiming further comprises:
    adding inverse-edge-triggered circuit state elements.

5. The method recited in claim 1, wherein the computing comprises:
    assigning a switching activity value at one of the input ports of a circuit element to the switching activity value at the output port of the circuit element if the weighted sum of the switching activity values at the input ports of the circuit element is less than the switching activity value at the one of the input ports.

6. The method recited in claim 1, wherein the computing comprises:
    assigning an upper threshold value to the switching activity value at the output port of a circuit element if the weighted sum of the switching activity values at the input ports of the circuit element is greater than the upper threshold value, the upper threshold value being derived based on signal propagation delay and slew rate.

7. The method recited in claim 1, wherein the identifying comprises:
    deriving cumulative switching activity values for regions in the circuit design based on the switching activity values at output ports of circuit elements in each of the regions.

8. The method recited in claim 7, wherein the retiming location information comprises information of switching activity relaxing point nodes determined based on the cumulative switching activity values.

9. The method recited in claim 8, further comprising:
    repositioning circuit state elements in the one or more regions to or near the switching activity relaxing point nodes.

10. One or more non-transitory computer-readable media storing computer-executable instructions for causing one or more processors to perform a method, the method comprising:

computing switching activity values at output ports of circuit elements of a circuit design based on switching activity values at input ports of the circuit elements and scaling factors associated with the circuit elements, the scaling factors representing effects of signal changes at the input ports on signal changes at the output ports, the computing comprising calculating weighted sums of the switching activity values at the input ports of each of the circuit elements using the scaling factors as relative weights;

identifying one or more regions of the circuit design for retiming based on the switching activity values at the output ports of the circuit elements; and determining retiming location information for the one or more regions based on the switching activity values at the output ports of the circuit elements, the retiming location information comprising information of one or more circuit nodes for placing circuit state elements to reduce switching activity in each of the one or more regions.

11. The one or more non-transitory computer-readable media recited in claim 10, wherein the method further comprises:

retiming the one or more regions based on the retiming location information.

12. The one or more non-transitory computer-readable media recited in claim 11, wherein the retiming comprises:

repositioning circuit state elements in the one or more regions, adding inverse-edge-triggered circuit state elements, or both.

13. The one or more non-transitory computer-readable media recited in claim 10, wherein the computing comprises:

assigning a switching activity value at one of the input ports of a circuit element to the switching activity value at the output port of the circuit element if the weighted sum of the switching activity values at the input ports of the circuit element is less than the switching activity value at the one of the input ports.

14. The one or more non-transitory computer-readable media recited in claim 10, wherein the computing comprises:

assigning an upper threshold value to the switching activity value at the output port of a circuit element if the weighted sum of the switching activity values at the input ports of the circuit element is greater than the upper threshold value, the upper threshold value being derived based on signal propagation delay and slew rate.

15. The one or more non-transitory computer-readable media recited in claim 10, wherein the identifying comprises:

deriving cumulative switching activity values for regions in the circuit design based on the switching activity values at output ports of circuit elements in each of the regions.

16. The one or more non-transitory computer-readable media recited in claim 15, wherein the retiming location information comprises information of switching activity relaxing point nodes determined based on the cumulative switching activity values.

17. A system, comprising:

one or more processors, the one or more processors programmed to perform a method, the method comprising:

computing switching activity values at output ports of circuit elements of a circuit design based on switching activity values at input ports of the circuit elements and scaling factors associated with the circuit elements, the scaling factors representing effects of signal changes at the input ports on signal changes at the output ports, the computing comprising calculating weighted sums of the switching activity values at the input ports of each of the circuit elements using the scaling factors as relative weights;

identifying one or more regions of the circuit design for retiming based on the switching activity values at the output ports of the circuit elements; and determining retiming location information for the one or more regions based on the switching activity values at the output ports of the circuit elements, the retiming location information comprising information of one or more circuit nodes for placing circuit state elements to reduce switching activity in each of the one or more regions.

18. The system recited in claim 17, wherein the method further comprises:

retiming the one or more regions based on the retiming location information.

19. The system recited in claim 18, wherein the retiming comprises:

repositioning circuit state elements in the one or more regions, adding inverse-edge-triggered circuit state elements, or both.

20. The system recited in claim 17, wherein the computing comprises:

assigning a switching activity value at one of the input ports of a circuit element to the switching activity value at the output port of the circuit element if the weighted sum of the switching activity values at the input ports of the circuit element is less than the switching activity value at the one of the input ports.

21. The system recited in claim 17, wherein the computing comprises:

assigning an upper threshold value to the switching activity value at the output port of a circuit element if the weighted sum of the switching activity values at the input ports of the circuit element is greater than the upper threshold value, the upper threshold value being derived based on signal propagation delay and slew rate.

22. The system recited in claim 17, wherein the identifying comprises:

deriving cumulative switching activity values for regions in the circuit design based on the switching activity values at output ports of circuit elements in each of the regions.

23. The system recited in claim 22, wherein the retiming location information comprises information of switching activity relaxing point nodes determined based on the cumulative switching activity values.

* * * * *